C. R. DAIGH.
GRAIN SAVING DEVICE FOR THRESHING MACHINES.
APPLICATION FILED JUNE 16, 1919.

1,324,233.

Patented Dec. 9, 1919.
2 SHEETS—SHEET 1.

Witness:
A. J. Sauser.

Inventor:
Charles R. Daigh,
By James A. Walsh,
Atty.

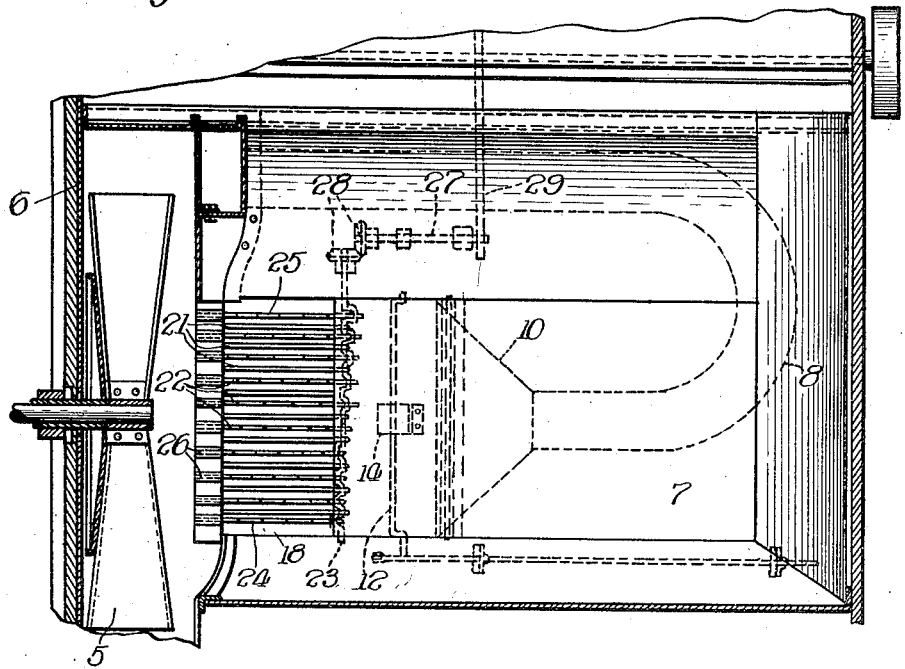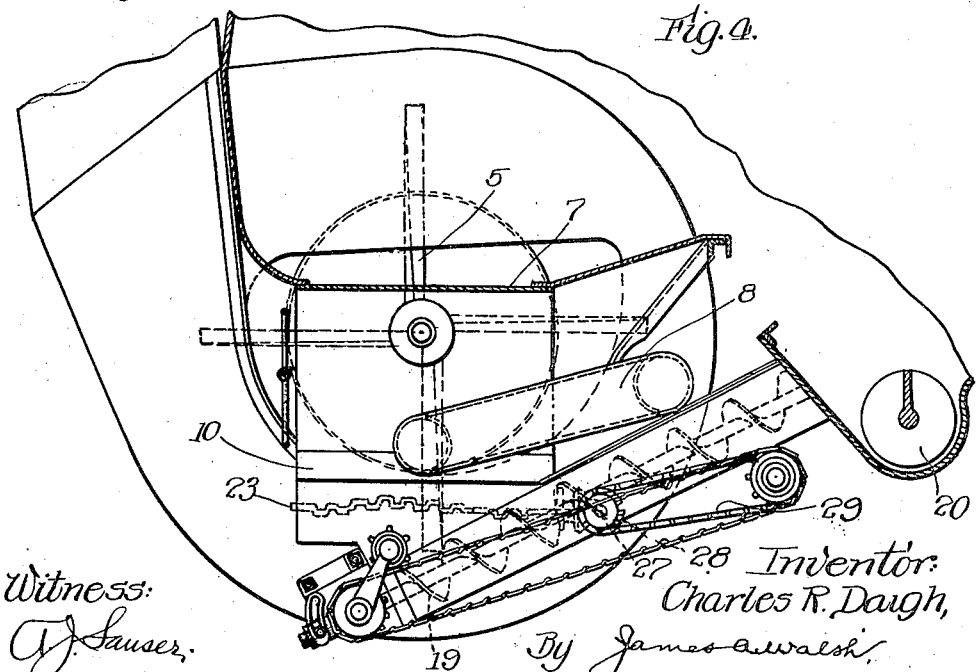

UNITED STATES PATENT OFFICE.

CHARLES R. DAIGH, OF PARSONS, KANSAS, ASSIGNOR OF ONE-HALF TO HOMER H. POOLE, OF PARSONS, KANSAS.

GRAIN-SAVING DEVICE FOR THRESHING-MACHINES.

1,324,233.  Specification of Letters Patent.  Patented Dec. 9, 1919.

Application filed June 16, 1919. Serial No. 304,401.

*To all whom it may concern:*

Be it known that I, CHARLES R. DAIGH, a citizen of the United States, residing at Parsons, in the county of Labette and State of Kansas, have invented certain new and useful Improvements in Grain-Saving Devices for Threshing-Machines, of which the following is a specification.

My present invention relates to improvements in that class of grain saving devices for threshing machines which are embodied in the wind stacker, and consists in certain details of construction and arrangements of parts whereby I am enabled to both agitate the material entering the stacker fan and thus obtain a high efficiency in separation, and also to control the air distribution as applied to such separation in a manner that the air blast can be regulated to suit grains or seeds of varying characters, all as will be hereinafter more fully pointed out.

Figure 1:
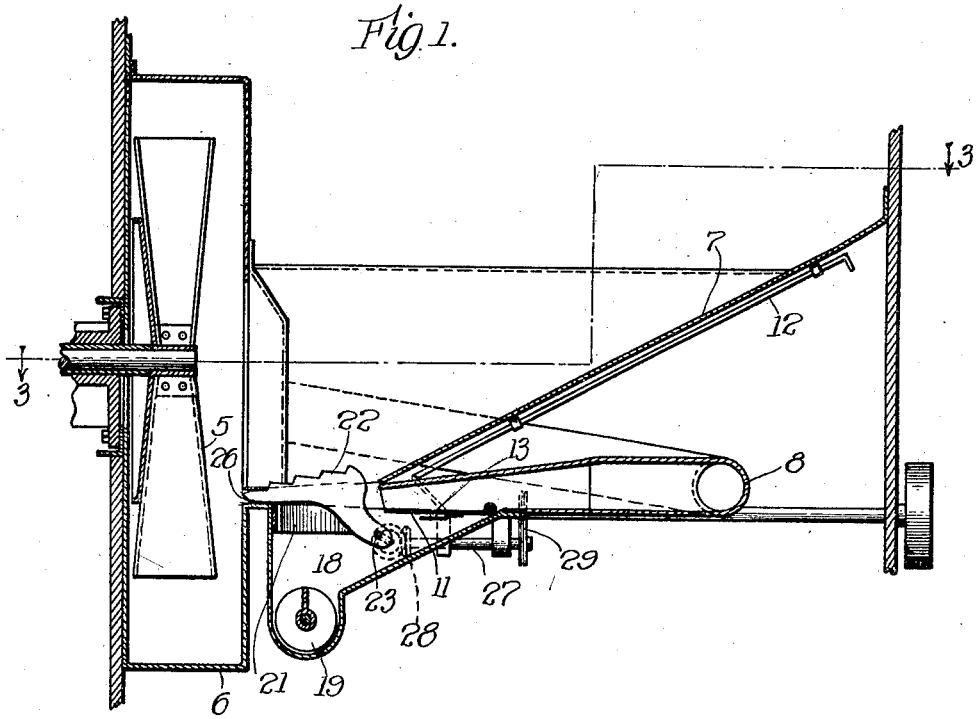
Figure 2:
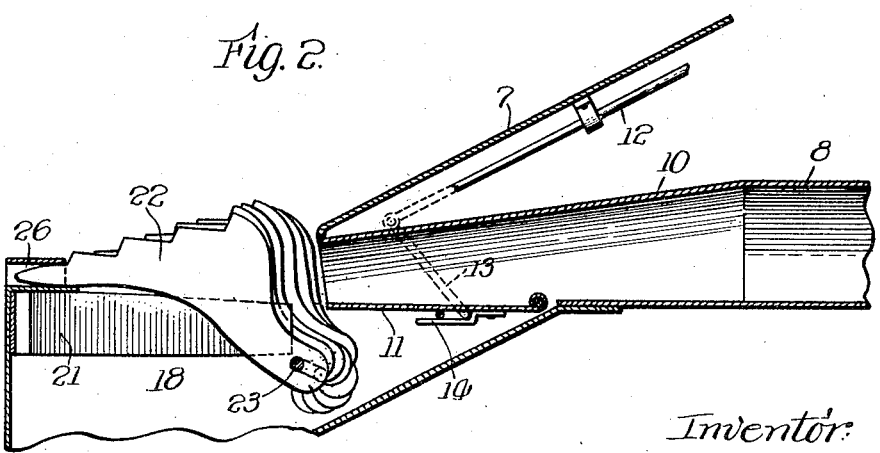

In the accompanying drawings, forming part hereof, Figure 1 is a transverse sectional view showing the stacker fan, material receiving and conveying hopper, and my improved devices associated therewith; Fig. 2, a similar view in detail indicating the agitators in operation; Fig. 3, a plan taken on the dotted line 3, 3, in Fig. 1, and Fig. 4 is a side elevation of the stacker structure.

In said drawings the portions marked 5, 6, indicate the stacker fan and its housing, respectively, with which the hopper, 7, communicates as usual. An auxiliary blast pipe, 8, is connected to the drum or housing, 6, in a well known manner, and leads around toward the eye of the fan where it is provided with a distributing nozzle, 10. As far as I am aware, such nozzles are of a fixed character with the result that a uniform air blast is discharged at all times; but I have found in practice that it is highly desirable to be enabled to control such blast to be discharged in a greater or lesser degree according to the nature of the material being handled, and this I accomplish by providing the lower portion, 11, of said nozzle 10 in adjustable form, so that the mouth of the nozzle may be decreased or enlarged according to circumstances by manipulating the lower hinged portion 11, which I preferably operate by a rod 12, extending along the lower side of the hopper 7 and having its lower end terminating in a bail or rock-shaft, 13, which is shifted back and forth by the movement of said rod 12 to raise and lower hinged portion 11, said bail or rock-shaft being preferably retained by a guide, 14. As indicated, I prefer to use a rod for the purpose, but as will be readily understood a cord or other appropriate arrangement may be utilized for manipulating such adjustable hinge.

As ordinarily constructed the grain trap, 18, comprises in part a series of stationary fingers through which grain is trapped and prevented from being discharged into the straw pile by the stacker fan and wasted, such saved grain being returned by a conveyer, as 19, to the tailings auger, 20, or other suitable part of the threshing machine, to be reclaimed. I have found by experience, however, that straw or other masses discharging from the hopper into the wind stacker at times are sluggish because of damp or other conditions and do not enter the stacker fan with sufficient rapidity to insure the most efficient handling of the material, which may consist of wheat, oats or rye straw, clover, millet and other seeds, the difference in character of which vary to a considerable degree. In order to faciliate the proper delivery of such materials into the stacker fan and at the same time improve the efficiency of the grain trap I provide between the stationary bars, 21, a preferably serrated agitating and propelling finger or bar as, 22, such fingers constituting a series which are mounted upon a compound crank shaft, 23, each of its cranks varying slightly in degree from the others so that each of such bars beginning with the outer one, 24, will be thrown or reciprocated slightly in advance of the next similar bar with the result that this series of bars when in operation will produce a wave-like motion beginning at the outer bar 24 and terminating at the distant bar, 25; in other words, each bar is so timed in sequence that reciprocation of one starts slightly ahead of the other to produce the peculiar motion explained. In order to insure that said agitating fingers 22 will be retained in their path of travel, I prefer to insert the ends of same in slide-ways, 26, at the lower side of the fan eye in drum 6, in which they are retained in their reciprocatory motion. It will be understood also that crank shaft 23 may be driven in any convenient manner, that shown (Fig. 3) being a counter shaft, 27, communicating with said crank shaft 23 by bevel gears, 28, power being delivered to said driving system through a belt or chain, 29, or other driving mechanism associated with the threshing machine. However, I do not desire to be understood as limiting myself to the precise arrangement and operation stated, for it is obvious that I may employ any suitable means to reciprocate said fingers in the manner stated or otherwise, my object being to provide suitable reciprocating fingers for accelerating the movement of material into the fan eye, and for so agitating such material that the ultimate grain or seed will be separated therefrom and discharged into the trap to be saved. By thus agitating the material at the point of delivery into the stacker fan and at the same time being enabled to determine and control the force of blast most suitable for winnowing the material at such point, I am enabled to obtain a highly efficient means of separation in a very simple manner.

I claim as my invention:

1. In a grain saving device for threshing machines, a material receiving and conveying hopper, a discharge fan communicating therewith, and grain trapping means interposed between said hopper and fan comprising reciprocatory elements for agitating and propelling material into said fan.

2. In a grain saving device for threshing machines, a material receiving and conveying hopper, a discharge fan communicating therewith, grain trapping means comprising a series of propellers for agitating and accelerating the movement of material into said fan, and means for imparting reciprocatory motion to said propellers.

3. In a grain saving device for threshing machines, a material receiving and conveying hopper, a discharge fan communicating therewith, grain trapping means comprising serrated propellers for agitating and accelerating the movement of material into said fan, and a crank shaft for imparting motion to said propellers.

4. In a grain saving device for threshing machines, a material receiving and conveying hopper, a discharge fan communicating therewith, grain trapping means comprising a series of propellers, means connected thereto for movably supporting said propellers, and means in said fan for retaining the delivery ends of said propellers in their movement.

5. In a grain saving device for threshing machines, a material receiving and conveying hopper, a discharge fan communicating therewith, grain trapping means interposed between said hopper and fan, a blast pipe connected to said fan, and an adjustable nozzle on said pipe for discharging a blast across said trap for winnowing the material passing therethrough.

6. In a grain saving device for threshing machines, a material receiving and conveying hopper, a discharge fan communicating therewith, agitating grain trapping means interposed between said hopper and fan, and adjustable means for delivering an air blast across said trap.

7. In a grain saving device for threshing machines, a material receiving and conveying hopper, a discharge fan communicating therewith, agitating grain trapping means, an adjustable nozzle for delivering an air blast across said trap, and means for adjusting said nozzle to increase or decrease its blast producing capacity.

In testimony whereof I affix my signature.

CHARLES R. DAIGH.